United States Patent
Yu

(10) Patent No.: US 7,275,821 B2
(45) Date of Patent: Oct. 2, 2007

(54) OPTICAL ADJUSTMENT SPECTACLES

(76) Inventor: Siu Yu, Rm. 105, Chang Wo House Chang On Estate Area 90, Ma On Shan, N.T. (HK)

(*) Notice: Subject to any disclaimer, the term of this patent is extended or adjusted under 35 U.S.C. 154(b) by 0 days.

(21) Appl. No.: 11/334,883

(22) Filed: Jan. 18, 2006

(65) Prior Publication Data

US 2006/0290880 A1    Dec. 28, 2006

Related U.S. Application Data

(60) Provisional application No. 60/693,636, filed on Jun. 25, 2005.

(51) Int. Cl.
*G02C 9/02* (2006.01)
(52) U.S. Cl. .......................... 351/59; 351/63
(58) Field of Classification Search ................. 351/59, 351/57, 63, 41, 158
See application file for complete search history.

(56) References Cited

U.S. PATENT DOCUMENTS

| 1,545,281 A | * | 7/1925 | Royak | 351/59 |
| 3,252,747 A | * | 5/1966 | Robins | 351/59 |
| 3,990,788 A | * | 11/1976 | Choy | 351/59 |

* cited by examiner

*Primary Examiner*—Hung Xuan Dang
(74) *Attorney, Agent, or Firm*—Raymond Y. Chan; David and Raymond Patent Group

(57) ABSTRACT

A spectacles includes two lenses, a spectacles frame and an adjustment hinge arrangement. The spectacles frame includes two supporting arms and a bridge extending between the two supporting arms. The adjustment hinge arrangement pivotally couples the two lenses with the two supporting arms respectively to pivotally fold the two lenses between an idle position and an usage position, wherein at the idle position, the two lenses are upwardly and pivotally flipped to move away from the bridge, and at the usage position, the two lenses are downwardly and pivotally flipped at a position that the bridge is positioned between the two lenses.

16 Claims, 13 Drawing Sheets

OPTICAL ADJUSTMENT SPECTACLES

CROSS REFERENCE OF RELATED APPLICATION

This is a non-provisional application of a provisional application having an application Ser. No. 60/693,636 and a filing date of Jun. 25, 2005.

BACKGROUND OF THE PRESENT INVENTION

1. Field of Invention

The present invention relates to a spectacles, and more particularly to a spectacles frame with freely flip-up lenses.

2. Description of Related Arts

Spectacles frames are widely used mainly for adjusting people's sight. When variation occurs on eyeballs due to some reason, people need to wear spectacles, which can adjust sight through the supplementary action of lenses' arc to anamorphic eyeballs.

The traditional spectacles have lens frame or lenses directly fastened to frame body and adjust sight through lenses. Such structure is proper to the young users. Because when people are young, their sight adjusting ability is strong. Even they are near-sighted or asthenopic, their near sight and far sight both are clear when they are wearing spectacles.

But people's sight adjusting ability is getting declining with ages. Even those whose vision is normal when they are young are good at far sight, they need to wear reading glasses during reading or writing. So when they need to watch near view and far view alternately, they have to sometimes take on glasses, sometimes take off glasses, which causing much inconvenience. There is also another kind of person who is shortsightedness when he or she is young, when they get old with weak sight adjusting ability, even they are good at far sight wearing traditional spectacles, but have vague near sight. So when those people need to watch near view and far view alternately, they also have to sometimes take on glasses, sometimes take off glasses, which causing much inconvenience.

SUMMARY OF THE PRESENT INVENTION

A main object of the present invention is to provide a spectacles comprising a hinge adjustment arrangement which allows a user to selectively adjust a position of two lenses of the spectacles for optimally fulfilling the need of the user in various circumstances.

Another object of the present invention is to provide a spectacles which is adapted to incorporate different set of lenses for performing different functions thereof, wherein a user is able to freely choose which set of lenses he/she is going to wear for performing predetermined tasks. For example, when the user having shortsightedness wishes to view objects which are far away from him/her, he/she may pivotally flip the lenses of the spectacles in order to clearly view the distant objects though those lenses.

Another object of the present invention is to provide a spectacles which can be adopted to form a wide variety of specific types of spectacles so as to facilitate a wide range of applications of the present invention. For example, the spectacles of the present invention may be modified as a flappable industrial goggle by incorporation protective lenses as the lenses of the present invention.

Another object of the present invention is to provide a spectacles which is simple in structure so as to minimize the manufacturing cost as well as the ultimate selling price of the present invention.

Accordingly, in order to accomplish the above objects, the present invention provides a spectacles, comprising:

two lenses;

a spectacles frame which comprises two supporting arms and a bridge extending between the two supporting arms; and an adjustment hinge arrangement pivotally coupling the two lenses with the two supporting arms respectively to pivotally fold the two lenses between an idle position and an usage position, wherein at the idle position, the two lenses are upwardly and pivotally flipped to move away from the bridge, and at the usage position, the two lenses are downwardly and pivotally flipped at a position that the bridge is positioned between the two lenses.

In other words, the present invention provides a spectacles frame with flip-up and changeable lenses. The spectacles frame comprises top bars, a pair of temples, a bridge, two nose supports, which form a frame body for mounting lens frame or a pair of lenses. Each of the top ends of two top bars has an active set, which can freely flip-up and assemble with diverse lens frame or lenses. Active sets connect with the top sides of lens frame or lenses respectively. Two ends of bridge are fastened to two sides of lens frame or lenses respectively. The old can adjust their sight freely using this spectacle frame. Those wearing reading glasses can put down the lenses in front their eyes for watching near view, however flip-up the lenses deviating from their eyes for watching far view. Those wearing optical frame can flip-up the lenses deviating from their eyes for watching near view, and put down the lenses in front of their eyes for watching far view. Thus the trouble caused by repeatedly wearing and taking off glasses is avoided. Meanwhile the active sets make freely assemble diverse degree or eyeshape lenses into reality. This not only greatly benefits the users, but helps the dealer decrease stock and investment.

The present invention is realized by the following technical solutions:

Firstly, top bars, a pair of temples, a bridge and two nose supports form a frame body under the present invention. Herein a pair of lens frames or lens is mounted on the frame body. Then an active set is extended from the top end of top bar respectively, which connect with the top sides of lens frame or lenses respectively.

The active set comprises cannulas, rotating shafts, springs or flexible washer. The contacting surfaces between cannulas or rotating shafts are dentate and mesh each other, thus rotating angle can be controlled by using of meshing movement. The rotating angle can be 60° 90° 120° 180° or any angle.

Of course the contacting surfaces between cannulas or rotating shafts also can be flat, thus the rotating shafts can do rolling movement at any angle within 360°.

On one side or both sides of each cannula have threads, which can attach with screws or nuts. So as to easily change the lens frame or lenses which are attached with rotating shafts.

Active sets can also amount locking arrangement, accordingly locking unit is mounted on frame lens or top bar. The locking arrangement and locking unit can be protruded or recessed or looped or in any other forms. Locking arrangement and locking unit can be made of magnetic material, which help much for more quickly, securely and convenient attachment by magnetic attraction. The existence of locking arrangement or locking unit is easily assemble top bar or change lens frame or lenses.

Also active hinges are extended from temples, bridge and top bar such parts. Thus the spectacle frame is foldaway.

These and other objectives, features, and advantages of the present invention will become apparent from the following detailed description, the accompanying drawings, and the appended claims.

DETAILED DESCRIPTION OF THE PREFERRED EMBODIMENT

Figure 1:
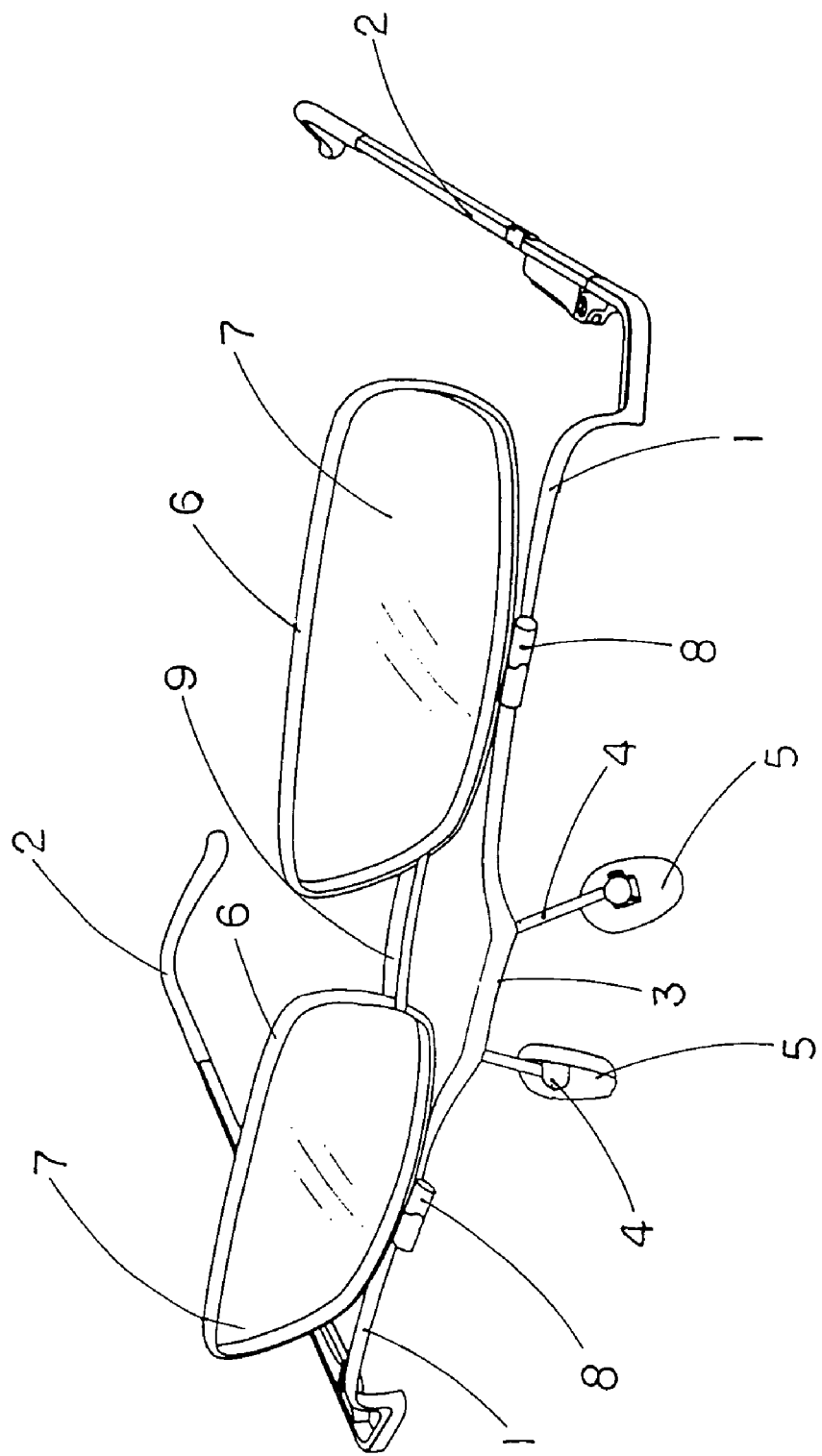
FIG. 1 is a perspective view of a spectacles according a preferred embodiment of the present invention.
Figure 12:
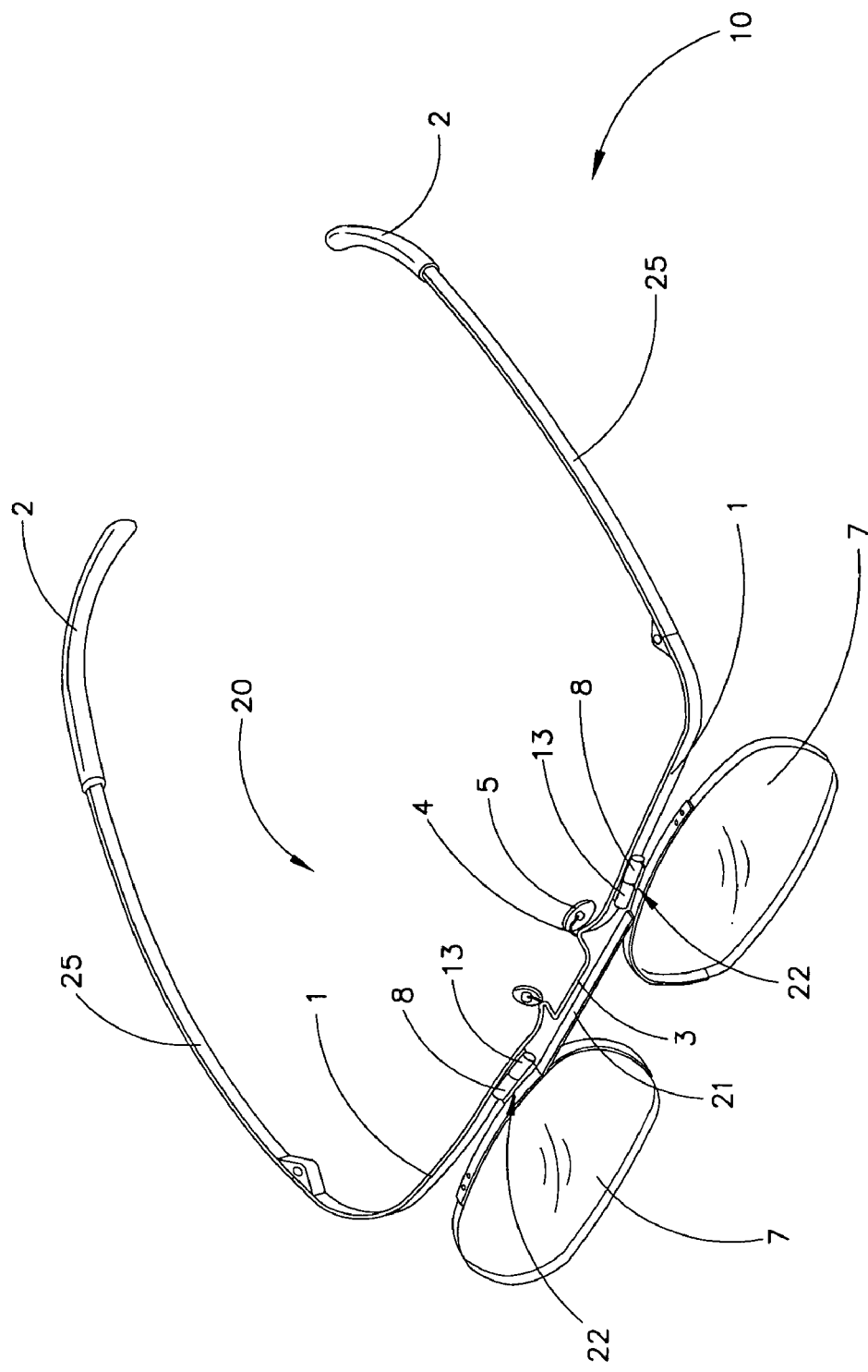
FIG. 12 is another perspective view of a spectacles frame according to the above preferred embodiment of the present invention.

Referring to FIG. 1 and FIG. 12 of the drawings, a spectacles according to a preferred embodiment of the present invention is illustrated. According to the preferred embodiment of the present invention, the spectacles comprises two lenses 7, a spectacles frame 10, and an adjustment hinge arrangement 20. The spectacles may be embodied as having a lenses frame 6 (FIG. 1), or frameless (FIG. 12).

The spectacles frame 10 comprises two supporting arms 13 and a bridge 3 extending between the two supporting arms 13, and two side extensions 25 outwardly extended from said supporting arms 13 for coupling a pair of temples 2 respectively.

The adjustment hinge arrangement 20 comprises two pivot hinges 22 pivotally coupling the two lenses 7 with the two supporting arms 13 respectively to pivotally fold the two lenses 7 between an idle position and an usage position, wherein at the idle position, the two lenses 7 are upwardly and pivotally flipped to move away from the bridge 3, and at the usage position, the two lenses 7 are downwardly and pivotally flipped at a position that the bridge 3 is positioned between the two lenses 7.

According to the preferred embodiment of the present invention, the spectacles frame 10 further comprises the pair of temples 2 rearwardly extended from the two supporting arms 13 respectively for wearing on a user's face, two pad arms 4 downwardly extended from the two supporting arms 13 respectively, and two nose pads 5 affixed on the two pad arms 4 respectively for supporting on the user's nose when the spectacles is worn on the user's face.

Accordingly, as shown in FIG. 1 of the drawings, the bridge 3 is extending between the two supporting arms 13 while the two lenses 7 are pivotally folded between the idle position and the usage position with respect to the two supporting arms 13 respectively. It is worth mentioning that the spectacles frame 10 may further comprise two lenses frames 6 peripherally mounted along an outer edge of the two lenses 7 respectively for reinforcing and two lenses 7 from external impact. According to the preferred embodiment of the present invention, the pivot hinges 22 are embodied as active set 8, the two supporting arms 13 are embodied as two top bars 1 respectively for pivotally mounting the two lenses 7 with the spectacles frame 10.

The adjustment hinge arrangement 20 further comprises a lens connecting arm 21 having two end portions connected with the two lenses 7 respectively, and the two pivot hinges 22 pivotally connecting the lens connecting arm 21 with the two supporting arms 13 in such a manner that the lenses 7 are pivotally connecting with the spectacles frame 10 through the two pivot hinges 22.

Figure 2:
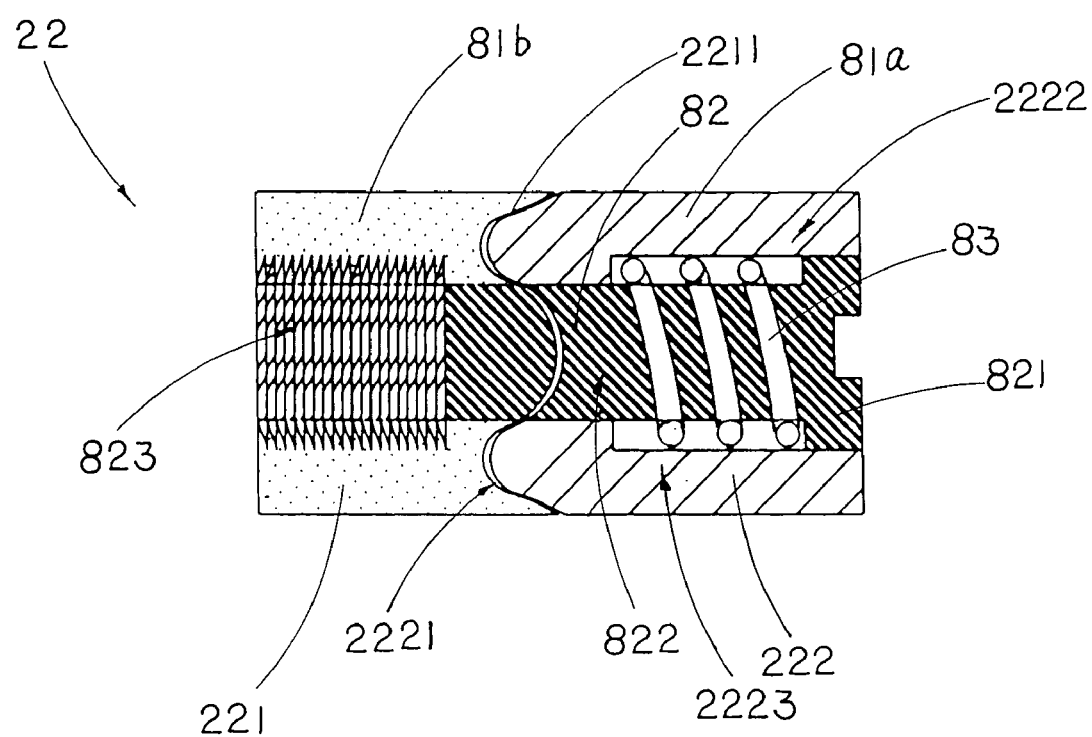
FIG. 2 is a sectional side view of the spectacles according to the above preferred embodiment of the present invention, illustrating the adjustment hinge arrangement of the spectacles.

More specifically, referring to FIG. 2 of the drawings, each of the pivot hinges 22 comprises a first tubular member 221, a second tubular member 222 connected with the corresponding supporting arm 13 and the lens connecting arm 21 respectively, a rotating shaft 82 received and extending in the first and the second tubular member 221, 222 for providing an axis of the pivotal movement of the first and the second tubular member 221, 222 so as to pivotally connect the two lenses 7 with the spectacles frame 10, and a resilient element mounted at the rotating shaft 82 and one of the first and the second tubular member 221, 222 for normally exerting a urging to guide the lenses 7 moving between the idle position and the usage position. According to the preferred embodiment of the present invention, the resilient element is preferably embodied as a compressive spring 83 mounted at the rotating shaft 82, as shown in FIG. 2 of the drawings.

In other words, each of the pivot hinges 22 comprises the first tubular member 221 transversely coupled with the respective supporting arm 13, the second tubular member 222 transversely coupled with an upper side of the respective lens 7 to coaxially align with the first tubular member 221, and the rotating shaft 82 connecting the first and second tubular members 221, 222 so as to pivotally connect the lens 7 with the respective supporting arm 13.

According to the preferred embodiment of the present invention, the rotating shaft 82, which is received in the first tubular member 221 and the second tubular member 222, has a shaft head portion 821, a shaft body portion 822, and a shaft bottom portion 823, wherein the head portion 821 is received in the second tubular member 222, the bottom portion 823 is received in the first tubular member 221, while the body portion 822 is extending from the second tubular member 222 to the first tubular member 221 for connecting the first tubular member 221 and the second tubular member 222 in a pivotally movable manner. Moreover, the resilient element is preferably mounted at the shaft body portion 822 of the rotating shaft 82 for exerting urging force thereto.

Accordingly, a diameter of shaft head 821 is slightly lager than a diameter of the resilient element, so that the resilient element is capable of mounting at the shaft body portion 822 while longitudinally biasing against the shaft head 821 of the rotating shaft 82 in the second tubular member 222. In other words, the resilient element is avoided to be detached from the rotating shaft 82. On the other hand, a diameter of the shaft body 822 is the same as the diameter of the shaft bottom 823.

Consequently, the resilient element is disposed in one of the first and second tubular member 221, 222 for applying an urging force against the rotating shaft 82 to pull the first and second tubular members 221, 222 towards each other so as to ensure the lens 7 being pivotally flipped with the respective supporting arm 13 between the idle position and the usage position.

It is worth mentioning that the first and the second tubular member 221, 222 may be embodied as first and second cannular 81*b*, 81*a* respectively so that the inner diameter of the first cannula 81*b* is more than one spring's diameter thicker than the outside diameter of shaft body 822.

In order to guide the pivotal movement of the first tubular member 221 and the second tubular member 222 by the rotating shaft 82, the shaft bottom portion 823 of the rotating shaft 82 is threaded while the first tubular member 221 has an inner bored portion correspondingly formed in alignment with the threaded shaft bottom 823, wherein the threaded shaft bottom 823 is arranged to engage with the bored portion of the first tubular member 221 in such a manner that the first tubular member 221 is adapted to pivotally move with respect to the rotating shaft 82 so as to move the two lenses 7 between the idle position and the usage position.

Each of the first and the second tubular member 221, 222 has first teeth edge 2211 and second teeth edge 2221 formed at two inner edges of the first and the second tubular member 221, 222 respectively, wherein the first and the second teeth edge 2211, 2221 are arranged to normally engage with and bias against each other for retaining the lens connecting arm 21 and the first and the second supporting arms 13 in position. It is worth mentioning that each of the first teeth edge 2211 and the second teeth edge 2221 has a wavy cross section for forming the teeth at the first teeth edge 2211 and the second teeth edge 2221. Accordingly, each of the first teeth edge 2211 and the second teeth edge 2221 has a plurality of concave portions and a plurality of convex portions alternatively and integrally extended to form the first teeth edge 2211 or the second teeth edge 2221.

Thus, each of the first and second teeth edges 2211, 2221 have a plurality of concave portions and a plurality of convex portions integrally extending therefrom to form a wavy engaging surface, wherein when the lenses 7 are pivotally flipped between the idle position and the usage position, the wavy engaging surface of the first tubular member 221 is engaged with the wavy engaging surface of the second tubular member 222 that the convex portions of the first tubular member 221 are engaged with the concave portions of the second tubular member 222 respectively.

As a result, the second tubular member 222 has an outer portion 2222 and an inner portion 2223 integrally extended from the outer portion 2222 to define the second teeth edge 2211 as the inner edge of the second tubular member 222, wherein the outer portion 2222 has an inner diameter larger than an inner diameter of the inner portion 2223 for receiving the shaft head 821 at the outer portion 2222. As shown in FIG. 2 of the drawings, the resilient element is in the outer portion 2222 of the second tubular member 222 adjacent to the shaft head 821 so as to normally exerting a longitudinal urging force towards the inner portion 2223 of the second tubular member 222.

In other words, when the lenses 7 pivotally move between the idle position and the usage position, the second tubular member 222 will rotate accordingly about the rotating shaft 82 so that the second teeth edge 2221 is driven to rotate while the first teeth edge 2211 remains stationary. As a result, when the concave portion of the first and the second teeth edge 2211, 2221 engage with each other, the first teeth edge 2211 and the second teeth edge 2221 will then be forced to move apart from each other so as to slightly push the first and the second tubular member 221, 222 to move apart for pivotally and upwardly flipping the lenses 7 from the usage position to the idle position while the resilient element is squeezed to compress within the second tubular member 222.

Consequently, when the second tubular member 222 continues rotating for pivotally moving the lenses 7 to move towards the idle position, the concave portion of the first teeth edge 2211 will then engage with the next convex portion of the second tubular member 222 and since they have been forced to move apart from each other, the resilient element will then exert the normally biasing force to push the second tubular member 222 longitudinally moving towards the first tubular member 221 for ensuring secure engagement between the first and the second teeth edge 2211, 2221.

In other words, the supporting arms 13 form two top bars 1 amounting an active set 8, which can freely flip-up and assemble with diverse lens frame 6 or lenses 7. Active sets 8 connect with the top sides of lens frame 6 respectively. As shown in FIG. 1 Two lens frames 6 are being flip-up about 120° by using of active sets 8, deviating from user's eyes. So user won't see through lenses 7. If user wants to watch near view, he or she can press the lens frame 6 containing lenses 7 down to be front of eyes, thus he or she can continue to do reading and writing.

Referring to FIG. 1 to FIG. 12 of the drawings, the active set 8 is preferably embodied as the cannulas 81, the rotating shafts 82 mounted inside of the cannulas 81, the springs 83 or a flexible washer 84, a screw 85 and nuts 86. As shown in FIG. 2 of the drawings, the cannula 81 comprises the cannula 81 *a* and the cannula 81*b,* both of which have same tooth shape, tooth quantity and dentate surface.

The spring 83 can be mounted inside of cannula 81*a* through shaft body 822. The outside diameter of shaft head 821 should attach with the inner diameter of cannula 81*a* to ensure the exterior of shaft head 821 do vertical motion closely attach the interior of cannula 81*a* and block spring 83 from taking off. The inner diameter of the close to attaching surface end of cannula 81*a* and cannula 81*b* should be same as the outside diameter of shaft body 822 and shaft bottom 823, because no spring is mounted there. Thus cannula 81 will not move up and down during meshing motion. The inner wall of cannula 81*b* has thread, which match well with the thread on the shaft bottom 823. So as to ensure rotating shaft 82 will not take off during cannula 81 meshing motion. The inner diameter of one end of cannula 81*a* is thinner than the other end mounting spring, which is to avoid spring 83 moving to cannula 81*b* direction under pressing.

The principle of active set 8 is when two cannula 81*a* and 81*b* are doing meshing motion, the tooth of cannula 81*b* will push the tooth of cannula 81*a* in a converse direction, herein squeeze spring 83. When spring 83 restores to stretch, the two cannulas 81*a*, 81*b* will mesh each other again. Under the pressure from spring's shrinkage, cannula 81*a* can turn up and down along dentation. Thus lens frame 6 or lenses 7 can be flipped up and down driven by cannula 81. And every angle of flip up and down is just same as the tooth angle of cannula 81. If lens frame 6 or lenses 7 are required to be changed, loosing the thread of shaft bottom 823 from the inside of cannula 81*b* fist, then change another lens frame 6 or lenses 7 with same cannula.

Figure 7:
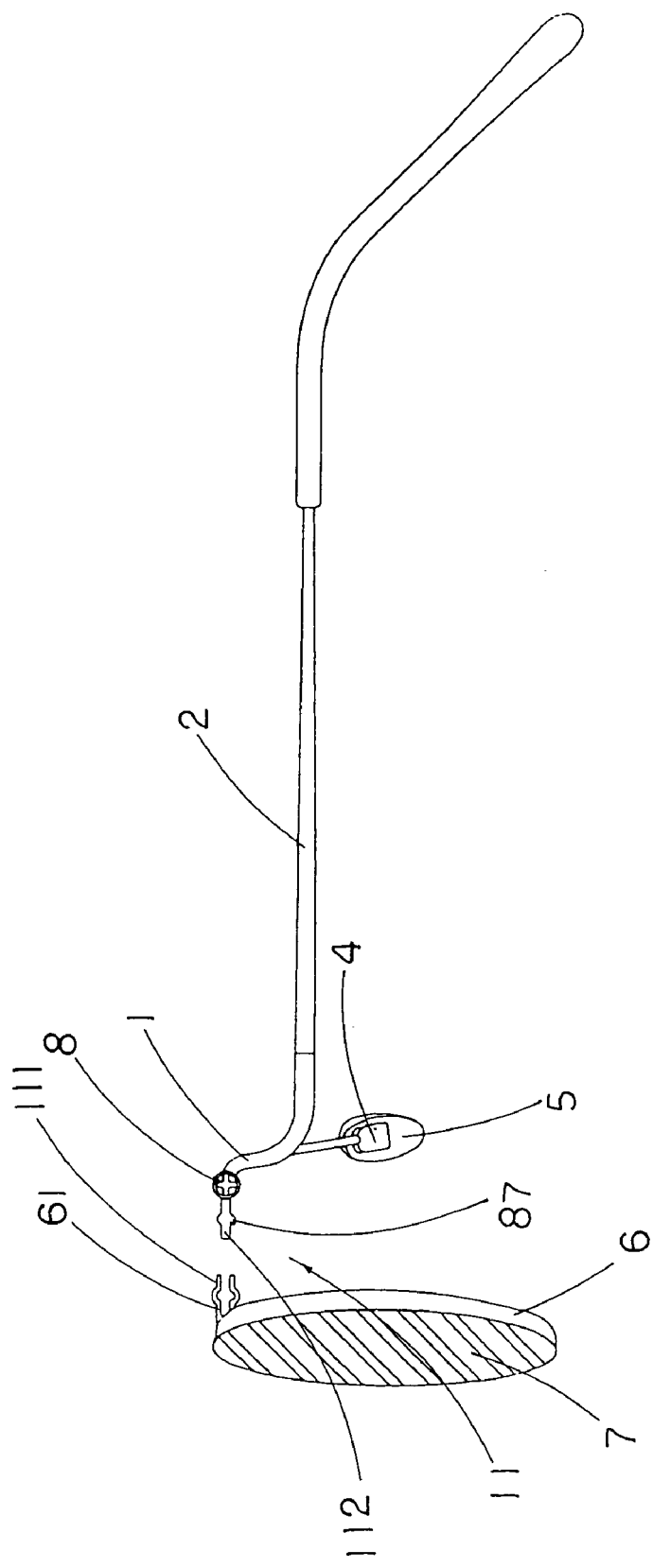
FIG. 7 is a first schematic diagram of the spectacles according to the above preferred embodiment of the present invention, illustrating the locking unit of the hinge mounting arrangement.

Referring to FIG. 7 of the drawings, the adjustment hinge arrangement 20 further comprises two locking units 11 connecting the supporting arm 13 with the respective lens 7. According to the preferred embodiment of the present invention, each of the locking units 11 comprises a locking socket 111 extended from the lens 7, and a locking plug 112 extended from the first tubular member 222 of the pivot hinge 22, wherein the locking plug 112 is adapted to received into the locking socket 111 for connecting the pivot hinge 22 with the respective lens 7.

In other words, the active set 8 interlocks with lens frame 6 respectively. One end of active set 8 is fastened to top bar 1, from the other end extrudes a block, which has one or more protruded or recessed locking arrangement 87. On the top side of the lens frame 6 has a slot, wherein has protruded or recessed lock unit 61 accordingly with locking arrangement 87. Insert the slot of lens frame 6 into the block of active set 8, thus locking unit 11 interlock with locking arrangement 87.

Figure 8:
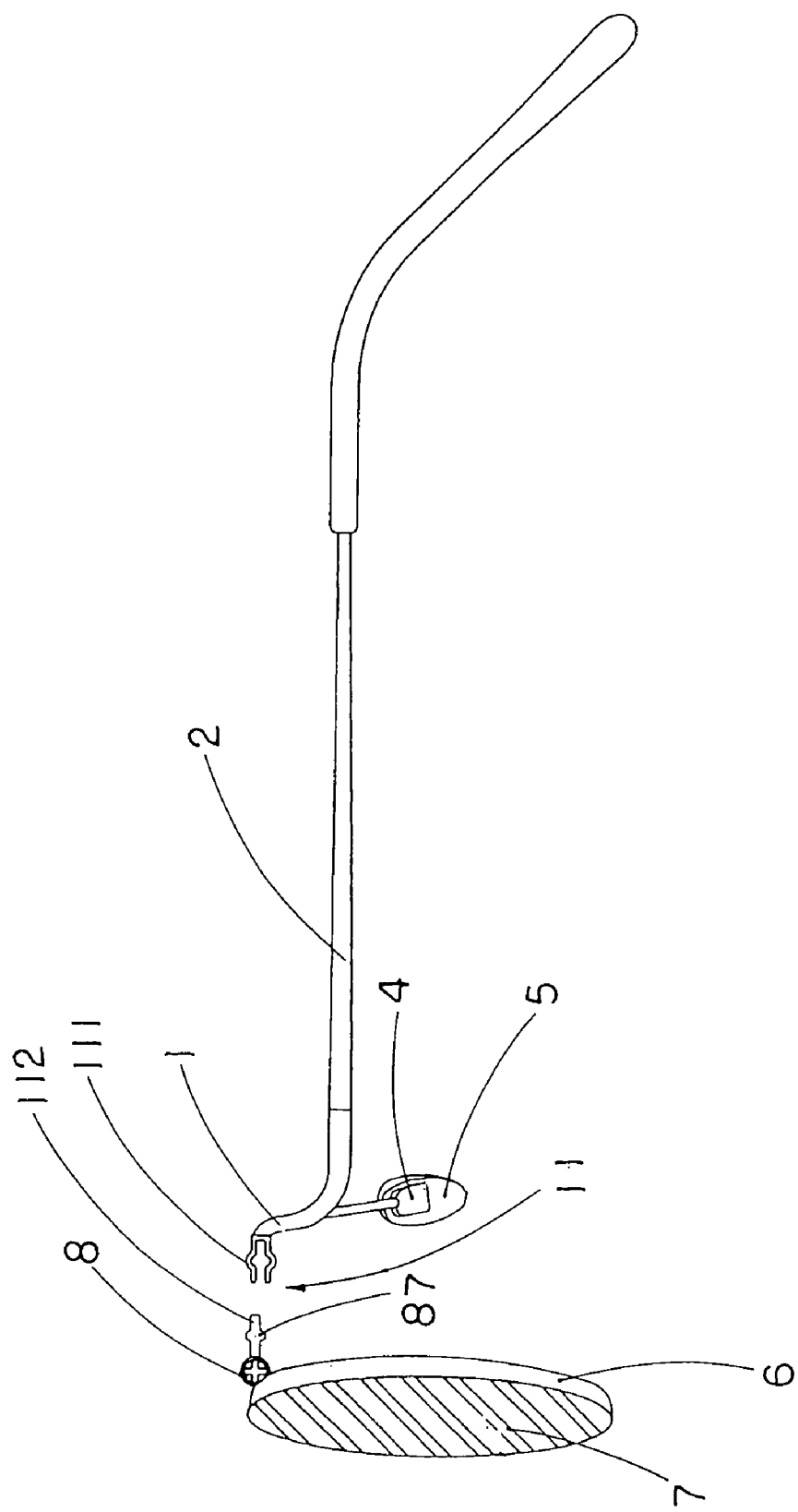
FIG. 8 is a second schematic diagram of the spectacles according to the above preferred embodiment of the present invention, illustrating the locking unit of the hinge mounting arrangement.
Figure 9:
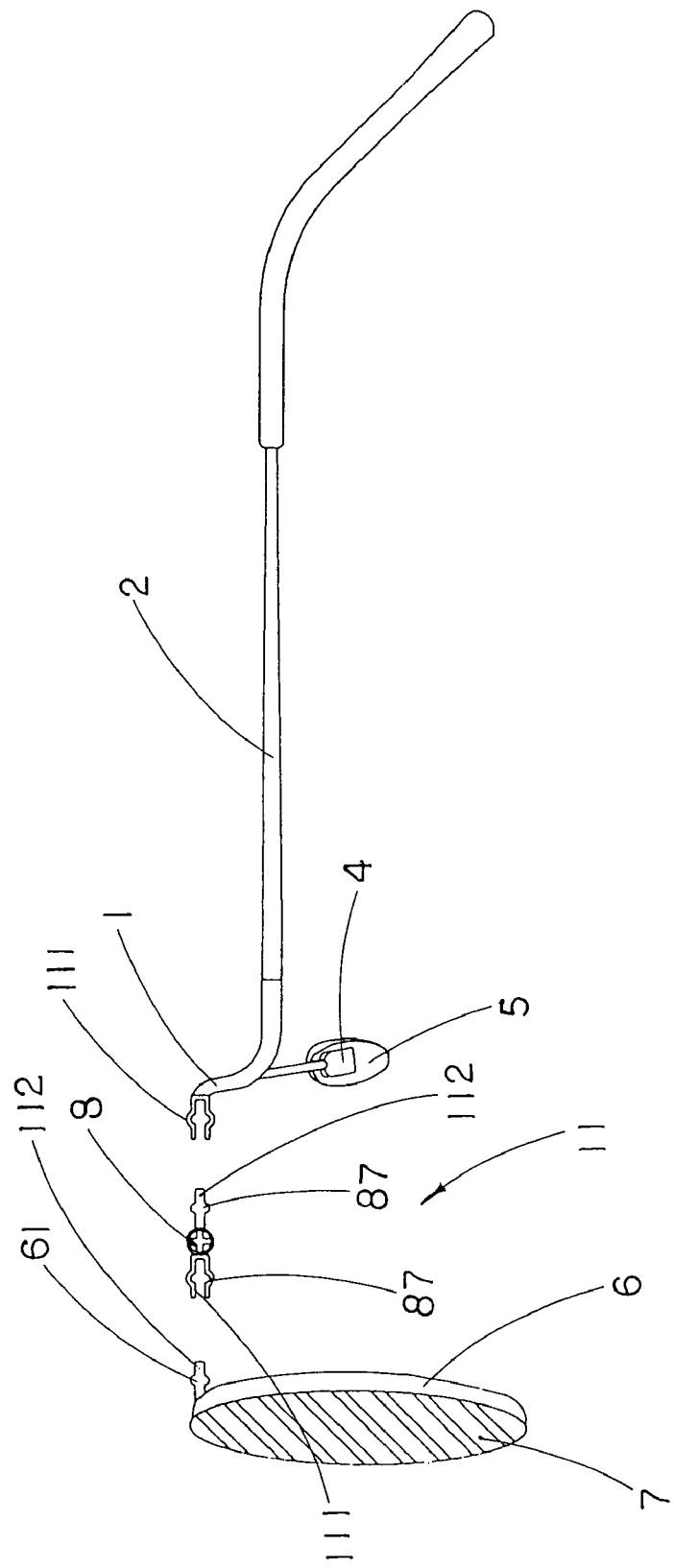
FIG. 9 is a third schematic diagram of the spectacles according to the above preferred embodiment of the present invention, illustrating the locking unit of the hinge mounting arrangement.

FIG. 8 to FIG. 9 illustrate two other alternatives to the locking unit 11. As shown in FIG. 8 of the drawings, the second tubular member 222 is extended from the respective lens 7 while the locking plug 112 is extended from the first tubular member 221, On the other hand, the locking socket 111 is extended from the respective supporting arm 13 for connecting the spectacles frame 10 with the lenses 7 in the above-mentioned pivotally movable manner.

As shown in FIG. 9 of the drawings, one end of active set 8 interlocks with the top bar 1 and the other end of active set 8 interlock with lens frame 6. Locking arrangement 87 is mounted on two ends of active set 8 respectively. Wherein locking plug 112 is mounted on lens frame 6 and locking socket 111 is mounted on top bar 1. Locking plug 112 and locking socket 111 interlocks with locking arrangements of active set 8 respectively, thus lens frame is amounted and flip up and down.

In other words, the hinge mounting arrangement 20 further comprises two locking units 11 (altogether four locking units 11 for the spectacles), wherein each two locking units 11 are adapted to mount one of the lenses 7 with the respective supporting arm 2. Thus, for each two locking units 11, one of the locking plugs 112 is extended from the respective lens 7 while the corresponding locking socket 111 is extended from the second tubular member 222. Moreover, another of the locking socket 111 is extended from the first tubular member 221 while another of the locking plug 112 is extended from the corresponding supporting arm 13.

Figure 10:
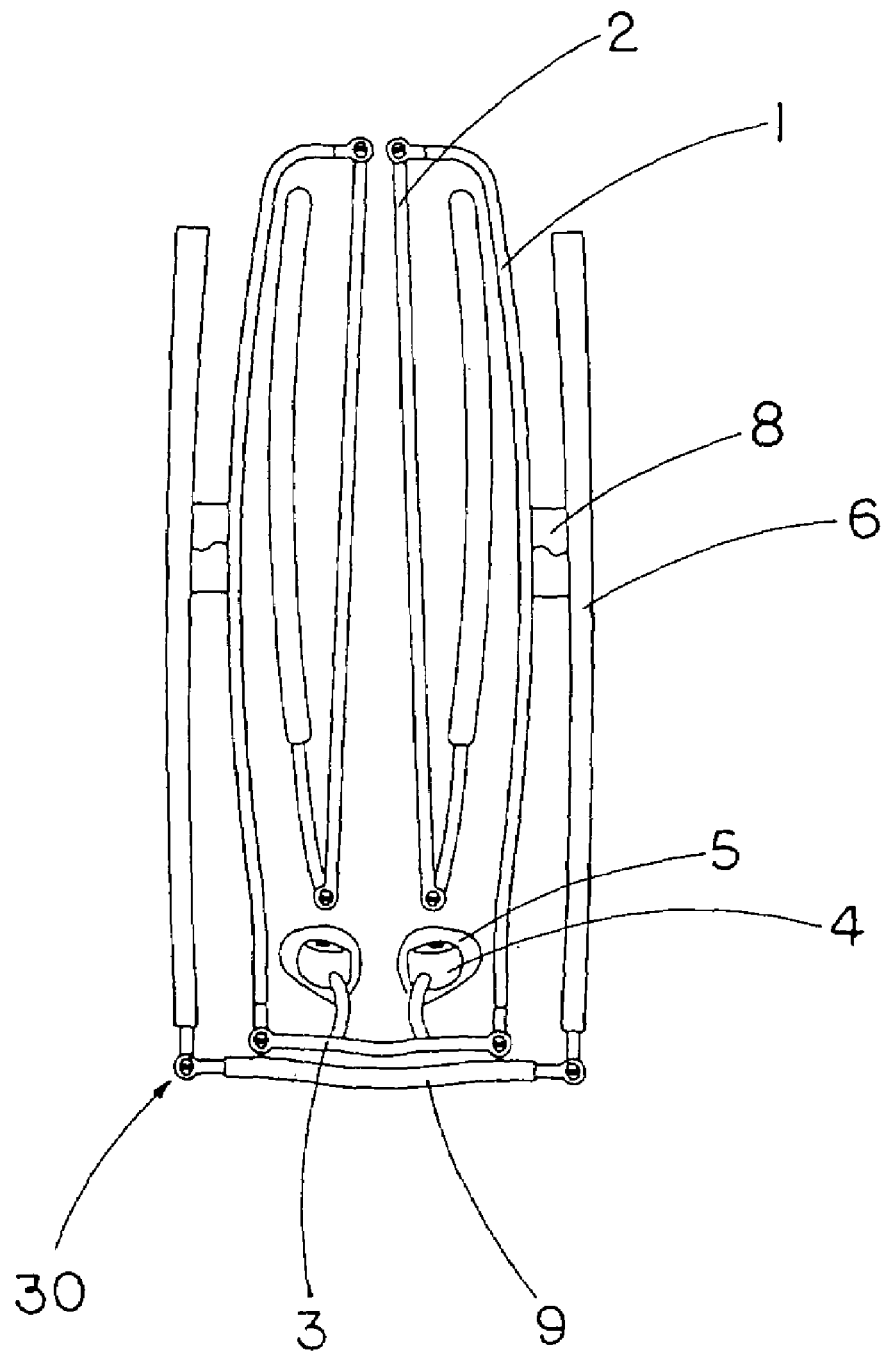
FIG. 10 is a fourth schematic diagram of the spectacles according to the above preferred embodiment of the present invention, illustrating the locking unit of the hinge mounting arrangement.

Referring to FIG. 10, a folded spectacle frame of the present invention is illustrated, wherein active hinges are mounted on bridge 3 and temples 2 such parts. User can fold the spectacle frame by active hinges, so it can be carried easily.

In other words, the spectacles further comprises a plurality of foldable joints 30 provided on the spectacles frame 10 in such a manner that the spectacles frame 10 is adapted to fold into compact structure at the foldable joints 30.

More specifically, the foldable joints 30 may be provided at the bridge 3, the side extensions and the lens connecting arm 21 respectively, wherein the spectacle frame 10 is adapted to fold into a compact structure via the foldable joints 30.

Figure 3A:
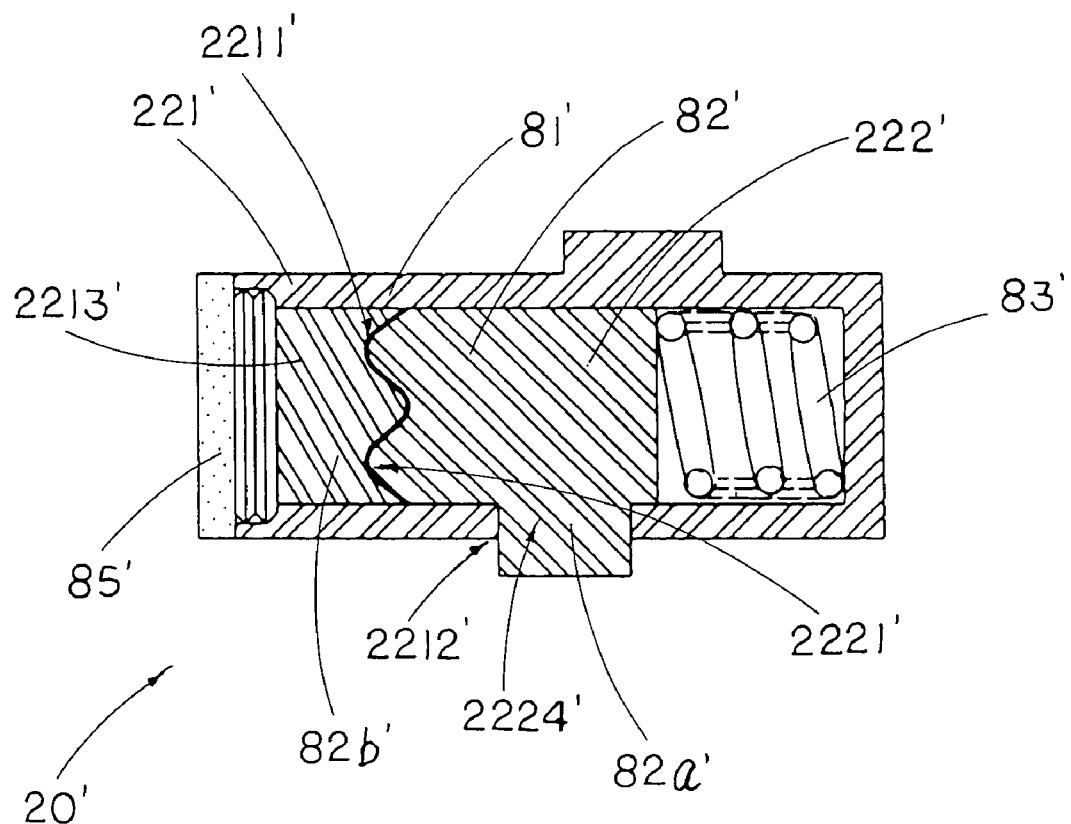
FIGS. 3A and 3B are first alternative mode of the spectacles according to the above preferred embodiment of the present invention.
Figure 3B:
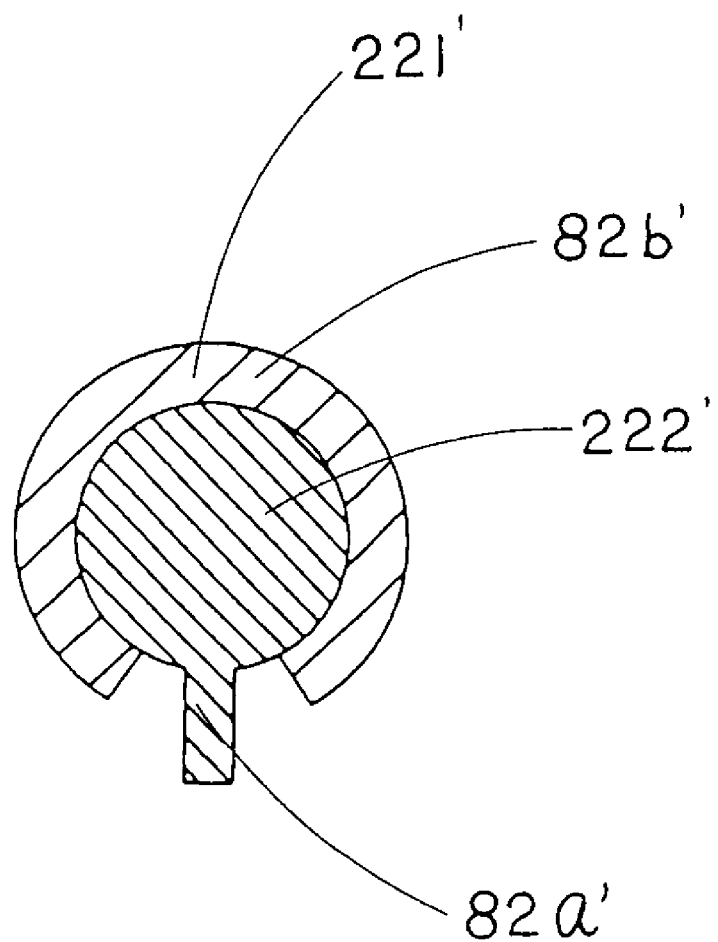

Referring to FIG. 3A and FIG. 3B of the drawings, a first alternative mode of the spectacles according to the preferred embodiment of the present invention is illustrated. The first alternative is similar to the preferred embodiment, except the adjustment hinge arrangement 20'.

As shown in FIG. 3A and FIG. 3B of the drawings, the meshing motion is going on inside of the cannula 81', which only comprises one cannula. Two rotating shaft 82*a'* and 82*b'*, both of which have same tooth shape, tooth quantity and dentate surface, and a piece of spring 83' are mounted inside of the cannula 81'. One top end of the cannula 81' is sealed and the other end of the cannula 81' is open having thread, which can interlock with screw 85'. A slot in cylindrical vertical plane of the cannula 81' is for inserting rotating shaft 82*a'* and help flip up and down motion.

Refer to FIG. 3B, of the drawings, because a handle extended from rotating shaft 82*a'* extrudes outside of the cannula 81' and attach with lens frame 6 or lenses 7, also the meshing motion is going on inside of the cannula 81', the movement will be more stable. However, the movement range is limited by the width of the vertical slot of cannula 81'. Screw 85' can loose to change the lens frame 6 or lenses 7 attached with rotating shaft 82*a'*.

In other words, according to the first alternative mode of the present invention, the first tubular member 221', having a through pivotal opening 2212' formed at a bottom sidewall thereof, is mounted on the respective supporting arm 13, whereas the second tubular member 222' is mounted within the first tubular member 221' for pivotally mounting the respective lens 7 to move between the usage position and the idle position. In order to allow pivotal movement of the second tubular member 222' within the first tubular member 221', the second tubular member 222' further has a connecting portion 2224' integrally extended within the first tubular member 221' to mount with the respective lens 7 via the pivotal opening 2212', in such a manner that the second tubular member 222' is adapted to pivotally move within the first tubular member 221' for driving the lens 7 to pivotally move between the idle position and the usage position by a pivotal movement of the connecting member 2224' along the pivotal opening 2212'. As a result, a length of the pivotal opening 2212' dictates the maximum possible length of the pivotal movement of the second tubular member 222'.

In addition, the first tubular member 221' has a pivot base 2213' formed therewithin to substantially align with the second tubular member 222' pivotally mounted adjacent to the pivot base 2213' within the first tubular member 221'. More specifically, the first and the second teeth edge 2211', 2221' are formed in the corresponding edge portions of the pivot base 2212' and the second tubular member 222' respectively for operatively engaging with each other. The resilient element, i.e. the spring 83' is mounted within the first tubular member 221' for normally exerting a biasing force against the second tubular member 222'.

When the lenses 7 pivotally move between the idle position and the usage position, the second tubular member 222' will rotate accordingly so that the second teeth edge 2221' is driven to rotate while the first teeth edge 2211' remains stationary. As a result, when the concave portion of the first and the second teeth edge 2211', 2221' engage with each other, the first teeth edge 2211' and the second teeth edge 2221' will then be forced to move apart from each other so as to slightly push the first and the second tubular member 221', 222' to move apart for pivotally and upwardly flipping the lenses 7 from the usage position to the idle position while the resilient element is squeezed to compress within the second tubular member 222'.

Consequently, when the second tubular member 222' continues rotating for pivotally moving the lenses 7 to move towards the idle position, the concave portion of the first teeth edge 2211' will then engage with the convex portion of the second tubular member 222' and since they have been forced to move apart from each other, the resilient element will then exert the normally biasing force to push the second tubular member 222' longitudinally moving towards the first tubular member 221' for ensuring secure engagement between the first and the second teeth edge 2211', 2221'.

In other words, each of the inner wall of the tubular member 221' and the rotating shaft 82' has a plurality of concave portions and a plurality of convex portions integrally extending therefrom to form a wavy engaging surface, wherein when the lenses 7' are pivotally flipped between the idle position and the usage position, the wavy engaging surface of the inner wall of the tubular member 221' is engaged with the wavy engaging surface of the rotating shaft 82' that the convex portions of the inner wall of the tubular member 221' are engaged with the concave portions of the rotating shaft 82' respectively.

Figure 4:
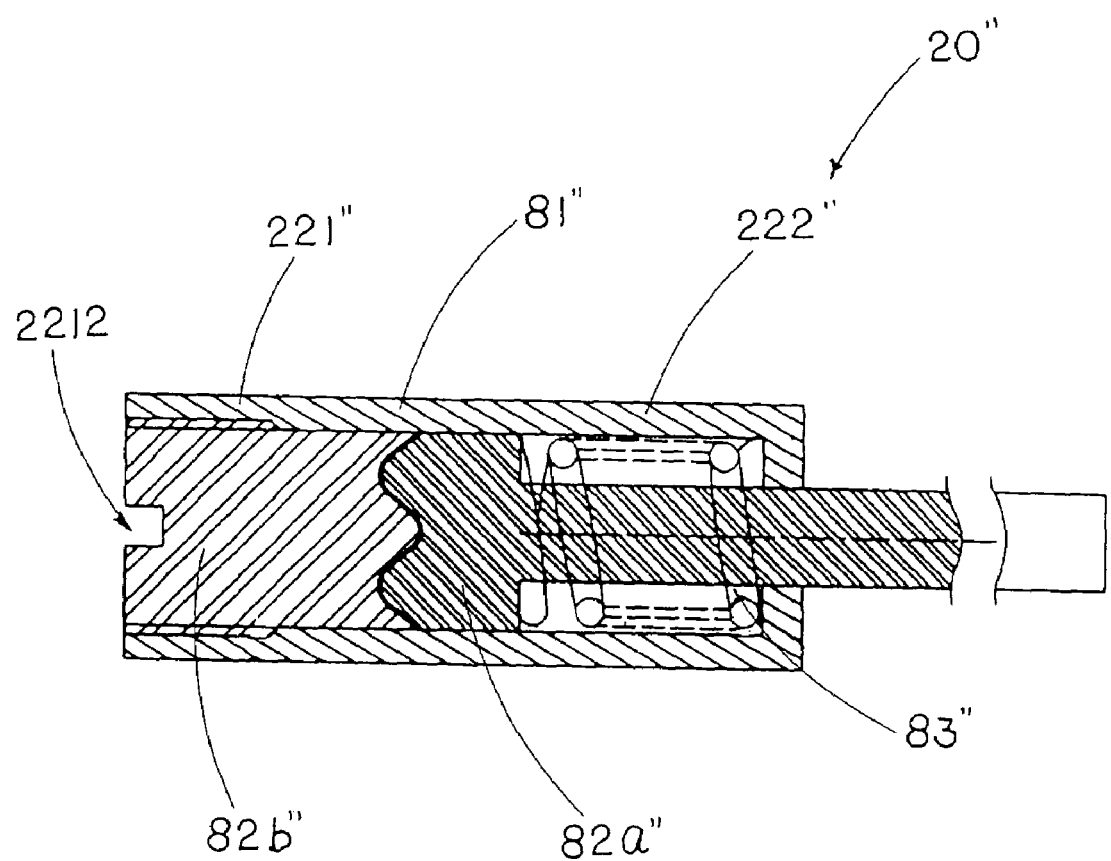
FIG. 4 is a second alternative mode of the spectacles according to the above preferred embodiment of the present invention.

Referring to FIG. 4 of the drawings, a second alternative mode of the spectacles according to the preferred embodiment of the present invention is illustrated. The second alternative mode is similar to the first alternative mode except the first and the second tubular members 221", 222".

The adjustment hinge arrangement 20" as shown in FIG. 4 of the drawings is similar to that shown in FIG. 3. Both make use of rotating shaft 82a", 82b" and spring 83" to drive meshing motion. The difference is both ends of cannula 81" as shown in FIG. 4 are open. And one end has thread, which attach with the thread on rotating shaft 82b".

The other end has a hole, from which rotating shaft 82a" gets through, attaches lens 7 and do 360° rotating motion.

Figure 5:
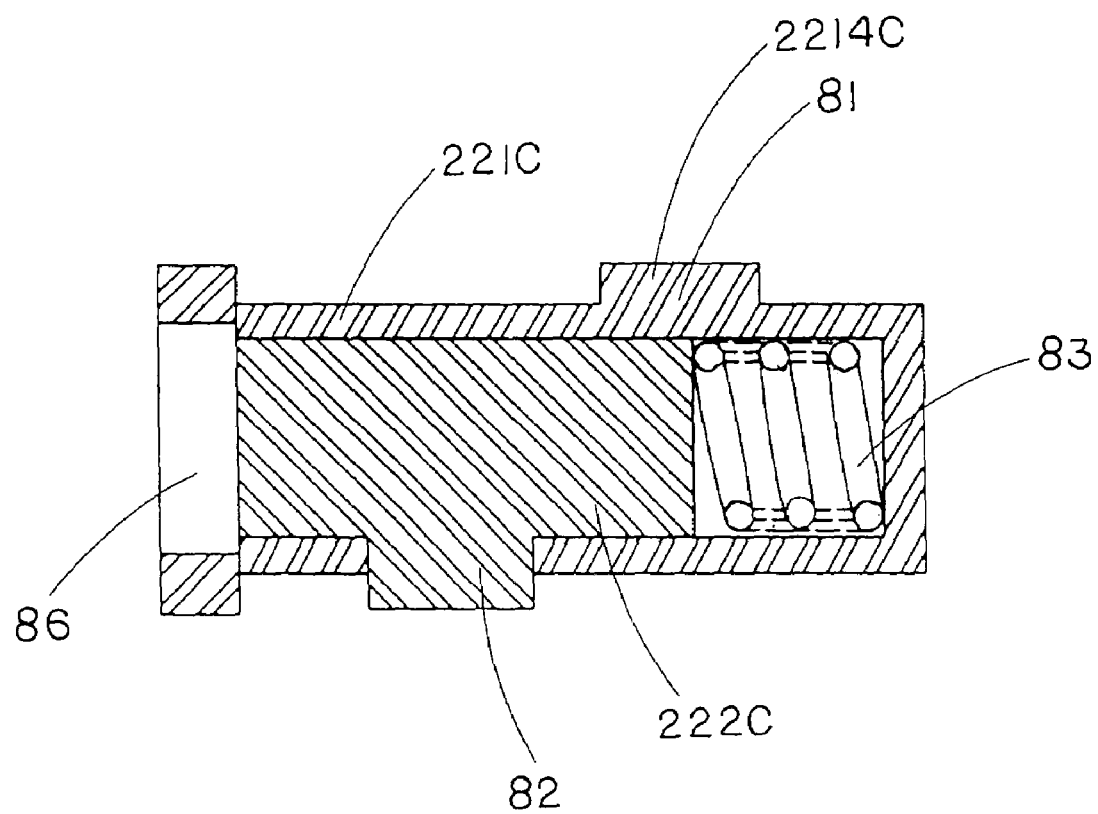
FIG. 5 is a third alternative mode of the spectacles according to the above preferred embodiment of the present invention.

Referring to FIG. 5 of the drawings, a third alternative mode of the spectacles according to the preferred embodiment of the present invention is illustrated. The third alternative mode is similar to the first alternative mode except the first and the second tubular members 221C, 222C.

According to the third alternative mode, the first tubular member 221C further comprises a mounting member 2214C integrally extended from an outer sidewall of the first tubular member 221C for mounting with the respective supporting arm 13. As a result, the first and the second tubular member 221C, 222C are adapted to pivotally move with respect to each other for pivotally flipping the respective lens 7 between the usage position and the idle position.

Figure 6:
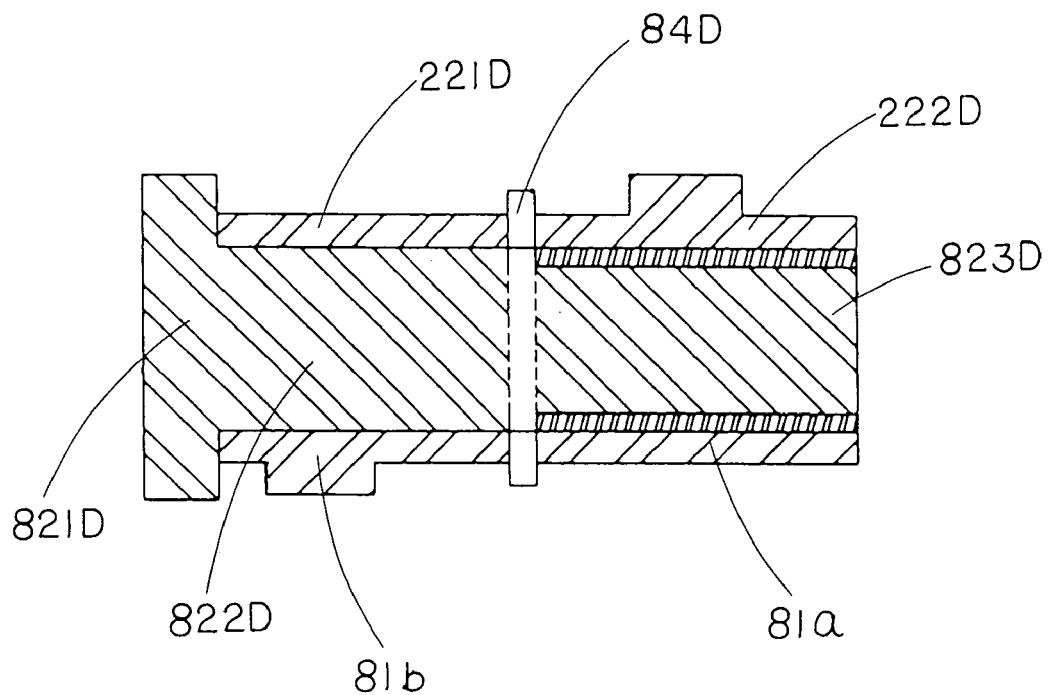
FIG. 6 is a fourth alternative mode of the spectacles according to the above preferred embodiment of the present invention.

Referring to FIG. 6 of the drawings, a fourth alternative mode of the spectacles according to the preferred embodiment of the present invention is illustrated. The fourth alternative mode is similar to the preferred embodiment except the first and the second tubular members 221D, 222D.

According to the fourth alternative mode, the resilient element is embodied as a spring washer 84D mounting the first tubular member 221D with the second tubular member 222D. The rotating shaft 82D is inserted into the first and the second tubular member 221D, 222D which are connected with the spectacles frame 10 and the corresponding lens 7 respectively. As a result, the first and the second tubular member 221D, 222D are capable of pivotally moving for pivotally guiding the respective lens 7 moving between the idle position and the usage position.

In other words, as shown in FIG. 6, the cannula 81D comprises 81a and 81b, both of with has same diameter and their ends are flat. Between cannula 81a and 81b there is spring washer 84D, which can enhance the friction power when cannula 81 is in motion. Shaft head 821D of rotating shaft 82D is bigger than cannula 81b, thus cannula 81b can be blocked firmly on shaft body 822D. The gap between shaft body 822D and cannula 81b should be decreased as small as possible, so as to enhance the friction power. Shaft bottom 823D has thread which attach with the thread inside cannula 81a. This active set 8 can do friction rotation at any angle within 360°, and function orientation at any angle when stopping force action.

Figure 11:
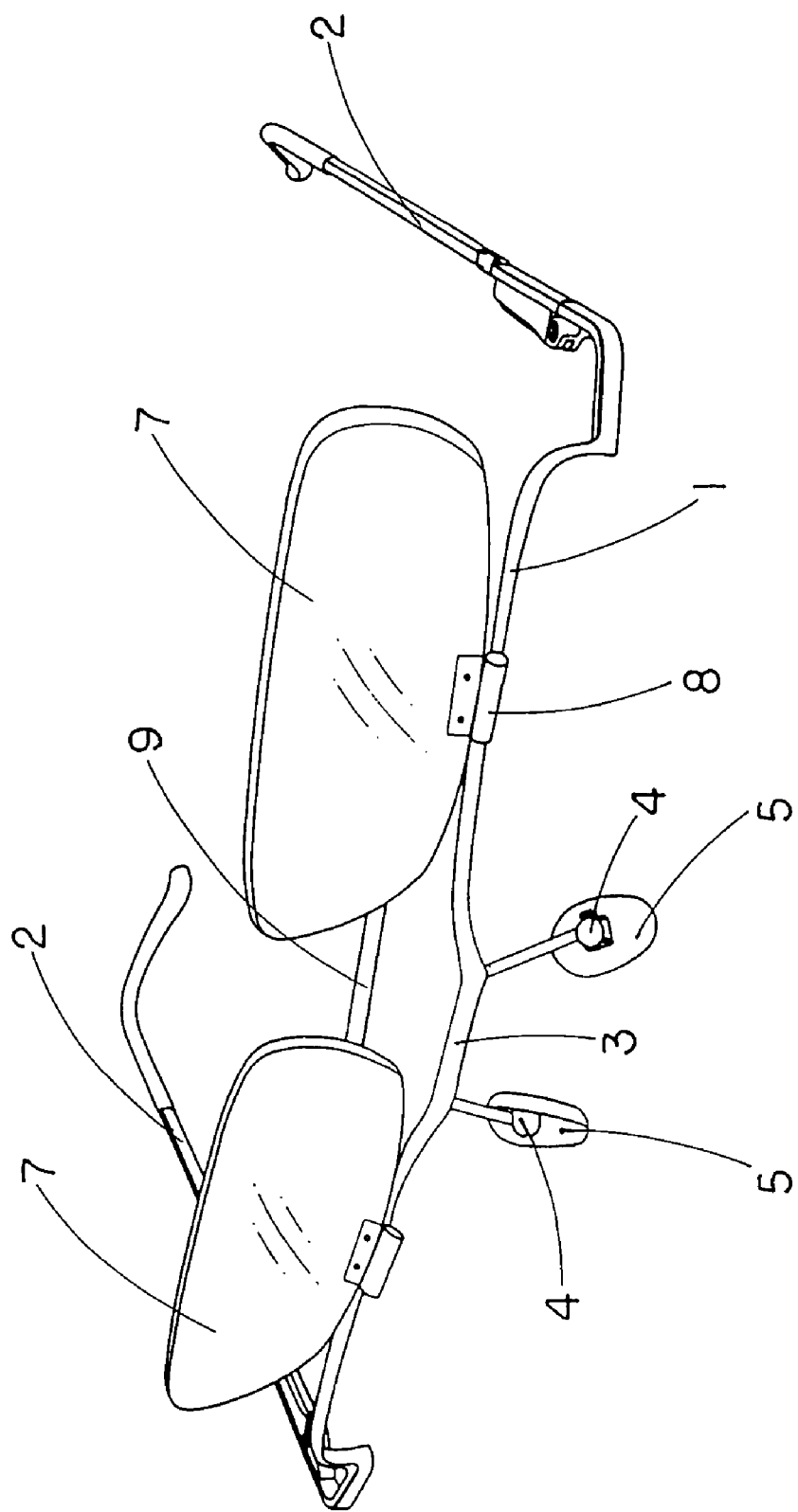
FIG. 11 is a perspective view of rimless spectacles frame according to the above preferred embodiment of the present invention.

Referring to FIG. 11, a rimless spectacle frame of the present invention is illustrated, wherein active sets 8 are fastened to lenses 7 directly and bridge 9 is fastened to two sides of lenses 7 directly.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A spectacles, comprising:

two lenses;

a spectacles frame which comprises two supporting arms, a bridge extending between said two supporting arms, and two side extensions outwardly extended from said supporting arms for coupling a pair of temples respectively; and an adjustment hinge arrangement comprising two pivot hinges pivotally coupling said two lenses with said two supporting arms respectively to pivotally fold said two lenses between an idle position and an usage position, wherein at said idle position, said two lenses are upwardly and pivotally flipped to move away from said bridge, and at said usage position, said two lenses are downwardly and pivotally flipped at a position that said bridge is positioned between said two lenses;

wherein each of said pivot hinges comprises a first tubular member transversely coupled with said respective supporting arm, a second tubular member transversely coupled with an upper side of said respective lens to coaxially align with said first tubular member, a rotating shaft connecting said first and second tubular members so as to pivotally connect said lens with said respective supporting arm, and a resilient element disposed in one of said first and second tubular member for applying an urging force against said rotating shaft to pull said first and second tubular members towards each other so as to ensure said lens being pivotally flipped with said respective supporting arm between said idle position and said usage position.

2. The spectacles, as recited in claim 1, wherein said first tubular member of each of said pivot hinges has a first teeth edge and said second tubular member of said pivot hinge has a corresponding second teeth edge engaging with said first teeth edge of said first tubular member so as to substantially retain said lens between said idle position and said usage position.

3. The spectacles, as recited in claim 2, wherein each of said first and second teeth edges has a plurality of concave portions and a plurality of convex portions integrally extending therefrom to form a wavy engaging surface, wherein when said lenses are pivotally flipped between said idle position and said usage position, said wavy engaging surface of said first tubular member is engaged with said wavy engaging surface of said second tubular member that said convex portions of said first tubular member are engaged with said concave portions of said second tubular member respectively.

4. The spectacles, as recited in claim 3, wherein said adjustment hinge arrangement further comprises a lens connecting arm having two end portions coupling with said two lenses respectively so as to pivotally flip said two lenses between said idle position and said usage position concurrently.

5. The spectacles, as recited in claim 4, further comprising two locking units for detachably mounting said lenses with said supporting arms respectively, wherein each of said locking units comprises a locking socket rearwardly extended from said respective lens and a locking plug which is frontwardly extended from said second tubular member and is detachably inserted into said locking socket so as to detachably interlock said lenses with said supporting arms respectively.

6. The spectacles, as recited in claim 4, further comprising a plurality of foldable joints provided at said bridge, said side extensions and said lens connecting arm respectively, wherein said spectacle frame is adapted to fold into a compact structure via said foldable joints.

7. The spectacles, as recited in claim 4, further comprising two locking units for detachably mounting said lenses with said supporting arms respectively, wherein each of said locking units comprises a locking socket frontwardly extended from said respective supporting arm and a locking plug which is rearwardly extended from said first tubular member and is detachably inserted into said locking socket so as to detachably interlock said lenses with said supporting arms respectively.

8. The spectacles, as recited in claim 4, further comprising two locking units for detachably mounting said lenses with said supporting arms respectively, wherein each of said locking units comprises two locking sockets frontwardly extended from said respective supporting arm and said respective second tubular member respectively and two locking plugs rearwardly extended from said respective lens and said respective first tubular member respectively, wherein said locking plugs are detachably inserted into said corresponding locking sockets respectively to detachably interlock said lenses with said supporting arms respectively.

9. A spectacles, comprising:

two lenses;

a spectacles frame which comprises two supporting arms, a bridge extending between said two supporting arms, and two side extensions outwardly extended from said supporting arms for coupling a pair of temples respectively; and an adjustment hinge arrangement comprising two pivot hinges pivotally coupling said two lenses with said two supporting arms respectively to pivotally fold said two lenses between an idle position and an usage position, wherein at said idle position, said two lenses are upwardly and pivotally flipped to move away from said bridge, and at said usage position, said two lenses are downwardly and pivotally flipped at a position that said bridge is positioned between said two lenses, wherein each of said pivot hinges comprises a tubular member transversely coupled with said respective supporting arm, and a rotating shaft coupled with an upper side of said respective lens, wherein said rotating shaft is rotatably received in said tubular member to pivotally connect said lens with said respective supporting arm, and a resilient element disposed in said tubular member for applying an urging force against said rotating shaft to pull said rotating shaft toward an inner wall of said tubular member so as to ensure said lens being pivotally flipped with said respective supporting arm between said idle position and said usage position.

10. The spectacles, as recited in claim 9, wherein each of said inner walls of said tubular member and said rotating shaft has a plurality of concave portions and a plurality of convex portions integrally extending therefrom to form a wavy engaging surface, wherein when said lenses are pivotally flipped between said idle position and said usage position, said wavy engaging surface of said inner wall of said tubular member is engaged with said wavy engaging surface of said rotating shaft that said convex portions of said inner wall of said tubular member are engaged with said concave portions of said rotating shaft respectively.

11. The spectacles, as recited in claim 10, wherein said adjustment hinge arrangement further comprises a lens connecting arm having two end portions coupling with said two lenses respectively so as to pivotally flip said two lenses between said idle position and said usage position concurrently.

12. The spectacles, as recited in claim 11, further comprising two locking units for detachably mounting said lenses with said supporting arms respectively, wherein each of said locking units comprises a locking socket rearwardly extended from said respective lens and a locking plug which is frontwardly extended from said rotating shaft and is detachably inserted into said locking socket so as to detachably interlock said lenses with said supporting arms respectively.

13. The spectacles, as recited in claim 11, further comprising two locking units for detachably mounting said lenses with said supporting arms respectively, wherein each of said locking units comprises a locking socket frontwardly extended from said respective supporting arm and a locking plug which is rearwardly extended from said tubular member and is detachably inserted into said locking socket so as to detachably interlock said lenses with said supporting arms respectively.

14. The spectacles, as recited in claim 11, further comprising two locking units for detachably mounting said lenses with said supporting arms respectively, wherein each of said locking units comprises two locking sockets frontwardly extended from said respective supporting arm and said respective tubular member respectively and two locking plugs rearwardly extended from said respective lens and said respective rotating shaft respectively, wherein said locking plugs are detachably inserted into said corresponding locking sockets respectively to detachably interlock said lenses with said supporting arms respectively.

15. The spectacles, as recited in claim 11, further comprising a plurality of foldable joints provided at said bridge, said side extensions and said lens connecting arm respectively, wherein said spectacle frame is adapted to fold into a compact structure via said foldable joints.

16. A spectacles, comprising:

two lenses;

a spectacles frame which comprises two supporting arms, a bridge extending between said two supporting arms, and two side extensions outwardly extended from said supporting arms for coupling a pair of temples respectively;

an adjustment hinge arrangement comprising two pivot hinges pivotally coupling said two lenses with said two supporting arms respectively to pivotally fold said two lenses between an idle position and an usage position, wherein at said idle position, said two lenses are upwardly and pivotally flipped to move away from said bridge, and at said usage position, said two lenses are downwardly and pivotally flipped at a position that said bridge is positioned between said two lenses, a lens connecting arm having two end portions coupling with said two lenses respectively so as to pivotally flip said two lenses between said idle position and said usage position concurrently; and a plurality of foldable joints provided at said bridge, said side extensions and said lens connecting arm respectively, wherein said spectacle frame is adapted to fold into a compact structure via said foldable joints.

* * * * *